US008733522B2

(12) United States Patent
Hoppe

(10) Patent No.: US 8,733,522 B2
(45) Date of Patent: May 27, 2014

(54) DUAL CLUTCH AND METHOD FOR CONTROLLING THE SAME

(75) Inventor: Marcus Hoppe, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 249 days.

(21) Appl. No.: 13/154,574

(22) Filed: Jun. 7, 2011

(65) Prior Publication Data

US 2011/0297501 A1  Dec. 8, 2011

(30) Foreign Application Priority Data

Jun. 7, 2010 (DE) .......................... 10 2010 022 919
Jul. 12, 2010 (DE) .......................... 10 2010 026 837

(51) Int. Cl.
*F16D 21/06* (2006.01)
*F16D 13/58* (2006.01)

(52) U.S. Cl.
USPC ...................... 192/48.91; 192/89.22; 192/101

(58) Field of Classification Search
None
See application file for complete search history.

(56) References Cited

U.S. PATENT DOCUMENTS

| 3,181,668 | A * | 5/1965 | Siuk ............................ 192/48.9 |
| 6,634,477 | B2 * | 10/2003 | Beneton et al. .............. 192/48.8 |
| 7,124,871 | B2 * | 10/2006 | Friedmann et al. .......... 192/99 S |
| 7,493,997 | B2 * | 2/2009 | Meinhard et al. ........... 192/30 V |

FOREIGN PATENT DOCUMENTS

WO    2008/058508 A1    5/2008

* cited by examiner

*Primary Examiner* — David D Le
*Assistant Examiner* — Mark Manley
(74) *Attorney, Agent, or Firm* — Lucas & Mercanti, LLP

(57) ABSTRACT

A dual clutch and a method for controlling the same in a drive train of a motor vehicle which has two friction clutches that transmit a torque from an internal combustion engine to respective transmission input shafts of a dual clutch transmission and which have a common counterpressure plate firmly connected to a crankshaft of the internal combustion engine and two contact plates that are fixed in terms of rotation relative to the counterpressure plate and can be moved axially by respective lever springs supported on a housing part firmly connected to the counterpressure plate. To limit the axial installation space for the dual clutch, the lever springs for actuating the friction clutches are actuated radially on the inside in the same direction by respective actuating systems in the case of a change from one friction clutch to the other of a torque to be transmitted via the friction clutches.

9 Claims, 2 Drawing Sheets

DUAL CLUTCH AND METHOD FOR CONTROLLING THE SAME

CROSS-REFERENCE TO RELATED APPLICATION

This application claims the priority of DE 10 2010 022 919.9 filed Jun. 7, 2010 and DE 10 2010 026 837.2 filed Jul. 12, 2010, which are both incorporated by reference herein.

FIELD OF THE INVENTION

The invention relates to a dual clutch and to a method for controlling a dual clutch in a drive train of a motor vehicle having two friction clutches.

BACKGROUND OF THE INVENTION

A dual clutch of the type in question in the form of a clutch unit with two friction clutches is known from WO 2008/058508 A1. Here, a counterpressure plate is firmly connected for conjoint rotation to a crankshaft of an internal combustion engine by means of housing components. On both sides, the counterpressure plate forms friction surfaces for contact with friction linings of respective clutch disks connected for co-rotation with a transmission input shaft of a dual clutch transmission. Provided at an axial distance from said friction surfaces, on both sides, there is in each case one contact plate, which is arranged in such a way as to allow axial movement and prevent rotation relative to the counterpressure plate and is acted upon by a respective lever spring to give frictional engagement, said levers being supported on a housing component and being acted upon radially on the inside along an axial actuating path by respective actuating systems. Here, the two lever springs are arranged axially adjacent to one another, and the movement of the contact plate arranged on the side of the counterpressure plate facing the internal combustion engine is accomplished by means of a tie rod, which engages on the contact plate over the counterpressure plate or through the latter and moves the contact plate when acted upon axially by the lever spring.

In this case, the two friction clutches are designed as "press-shut" or "pull-shut" friction clutches (normally open). This means that, when the radially inner lever tips of the lever springs are pushed in the direction of the internal combustion engine, the respective friction clutch is transferred from the open state to the closed state by the contact plates bringing the respective friction linings into frictional engagement with the counterpressure plate.

In this case, one friction clutch is opened and the other friction clutch is closed when the motor vehicle is being driven, and hence torque is transmitted to the driven wheels via the component drive train of the dual clutch transmission which is associated with the closed friction clutch, and the motor vehicle is driven, when a gear is engaged. In the component drive train which is associated with the open friction clutch, a corresponding subsequent gear can be preselected, and thus a gear change is performed in the form of an overlapping shift by swapping the torque provided by the internal combustion engine to the other friction clutch and hence to the other component drive train, with both friction clutches transmitting some of the torque in a transitional phase to avoid an interruption in tractive effort.

In the friction clutch disclosed, an overlapping shift is accomplished by a procedure in which one actuating system performs an actuating path in the direction of the internal combustion engine, thereby closing the friction clutch concerned, while the other actuating system traverses an actuating path in the direction of the dual clutch transmission in order to open this friction clutch. In order to make such overlapping shifts possible at all, the axial movements of the lever springs which take place during this process must be kinematically disentangled. For this purpose, the lever springs are spaced apart axially from each other, thereby additionally increasing the axial installation space requirement, which is already very large in the case of dual clutches.

It is therefore the object of the invention to propose a dual clutch with a smaller axial installation space requirement which simultaneously offers the possibility of overlapping shifts.

SUMMARY OF THE INVENTION

The invention is achieved by a dual clutch in a drive train of a motor vehicle having two friction clutches, which transmit a torque from an internal combustion engine to respective transmission input shafts of a dual clutch transmission and have a common counterpressure plate firmly connected to a crankshaft of the internal combustion engine and two contact plates, which are fixed in terms of rotation relative to said counterpressure plate and can be moved axially by means of respective lever springs supported on a housing part firmly connected to the counterpressure plate, wherein the lever springs for actuating the friction clutches are actuated radially on the inside in the same direction by respective actuating systems in the case of a change from one friction clutch to the other of a torque to be transmitted via the friction clutches.

According to the invention, the two friction clutches are designed in such a way that no intersecting, axially interfering movement of the lever springs occurs during an overlapping shift. This can be achieved, for example, by redesigning the shift patterns of the friction clutches. For example, an advantageous illustrative embodiment can provide a dual clutch in which a first of the friction clutches is designed as a pull-shut friction clutch and a second of the friction clutches is designed as a press-open friction clutch, or in which a first of the friction clutches is designed as a press-shut friction clutch and a second of the friction clutches is designed as a pull-open friction clutch. If, for example, in respect of the counterpressure plate, the first friction clutch faces the internal combustion engine and is actuated by means of a tie rod which passes through or overlaps the counterpressure plate and is acted upon by the lever spring, the first friction clutch is closed, e.g. pulled shut, and the second friction clutch is pressed open when the lever springs are acted upon by the corresponding actuating systems in the direction of the internal combustion engine. During an overlapping shift, the two lever springs are moved substantially in synchronism and can therefore be arranged at a comparatively small axial distance from one another, hence saving axial installation space.

To increase the actuating path, especially that of the press-open friction clutch, the contact plate can be chamfered radially on the inside in the actuating direction of the lever spring. By means of a conical, radially inward taper of the contact plate or by means of recesses introduced into the latter for the lever elements of the lever spring, the lever spring can be moved by an increased actuating path in the direction of the internal combustion engine, thus enabling the other lever spring to be moved axially closer thereto.

If, as proposed according to the invention, both friction clutches in a dual clutch are opened, a movement of the lever springs in the opposite direction occurs. For example, the lever tips of a pull-shut friction clutch facing the internal combustion engine are moved in the direction of the dual clutch transmission, and the lever tips of the opposite press-open friction clutch, that facing the transmission side, are moved in the direction of the internal combustion engine. Since this lever spring is supported on the housing of the friction clutch at a location axially closer to the internal combustion engine than the other lever spring, there is no interference. At most, the possibility of interference between the lever springs would arise when both friction clutches were closed. However, since this state is critical for safety in a dual clutch transmission, this state is not set by means of the automatically operated actuating systems. If one or both actuating systems fail, accidental interference is avoided since, although the lever springs approach one another in the state in which they are not subject to force, in the case of the preferred non-self-locking actuating systems for example, they do not interfere axially.

Furthermore, a control unit for controlling the dual clutch can be designed in such a way that a control state of the two friction clutches in which an interference between the lever springs can occur is excluded by means of a control procedure. If an interference is detected on the basis of acquired information, e.g. actuating paths, torques transmitted via the two friction clutches, speeds of the transmission input shafts and of the crankshaft, in the event of a malfunction, for example, or if it is likely according to a plausibility analysis, an appropriate emergency mode can be initiated, with one or both actuating systems being deenergized, for example. As an alternative or in addition, the two actuating systems can be operated in mutual dependence. In the case of a closing press-shut friction clutch, for example, a press-open friction clutch can be opened accordingly to avoid imposing strain on the dual clutch transmission and the threat of axial interference between the lever springs. It goes without saying that a self-adjusting compensation device for wear on the friction linings, such as a path-controlled or force-controlled adjusting device, can be provided in one or both friction clutches.

The invention is furthermore achieved by a method for controlling two actuating systems for actuating a dual clutch, which is described as being according to the invention in the application documents, in which method an actuating path of a first actuating system is defined as having priority, and an interference with this actuating path by an actuating path of the second actuating system is excluded. In this case, during a closing operation of a press-shut friction clutch facing the internal combustion engine along the actuating path defined as having priority, the actuating path of a press-open friction clutch can be controlled so as to be greater than or equal to the actuating path having priority.

BRIEF DESCRIPTION OF THE DRAWINGS

The invention is explained in greater detail with reference to the illustrative embodiment depicted in FIGS. 1 to 4, of which.

DETAILED DESCRIPTION OF THE INVENTION

Figure 1:
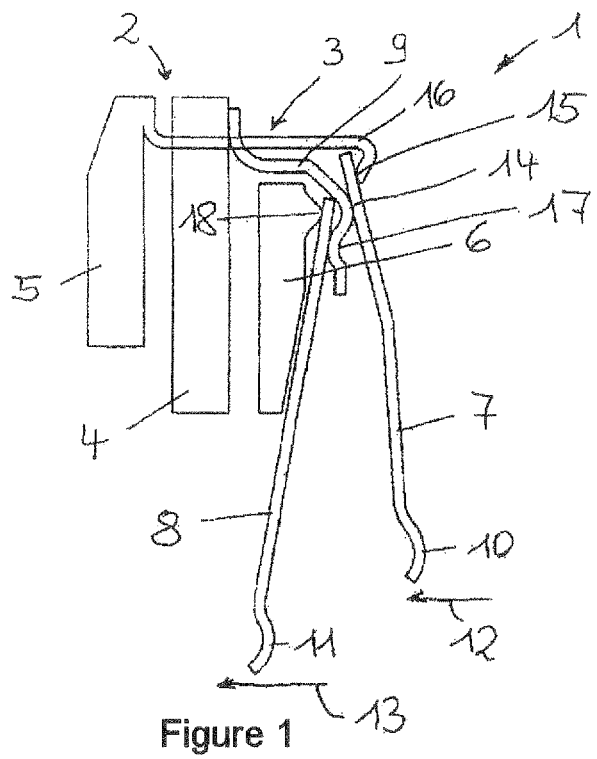
FIG. 1 shows a schematic partial section through a dual clutch with both friction clutches in the opened state.

FIG. 1 shows a schematic partial section through the dual clutch 1, which is rotationally symmetrical about an axis of rotation, with the friction clutches 2, 3. The two friction clutches 2, 3 have a common counterpressure plate 4, which is firmly connected to a crankshaft of an internal combustion engine in a manner not shown, and respective contact plates 5, 6, which can be moved axially to a limited extent relative to said counterpressure plate and are connected for conjoint rotation. Friction linings (not shown) of respective clutch disks are provided axially between the contact plates 5, 6 and the counterpressure plate 4 in a manner which allows them to be clamped axially. The clutches can be designed as single-disk clutches, having one clutch disk with a pair of friction surfaces, or as multi-disk clutches having a disk pack with more than two friction surfaces. To enlarge the friction surface area of the clutches, it is, however, also possible for each of the clutch disks to have further friction surface (pairs). The clutch disks are each connected to one transmission input shaft of a dual clutch transmission. The transmission input shafts are respective parts of two component drive trains of the dual clutch transmission. Torque is distributed between the component drive trains by opening and closing the friction clutches associated with the component drive trains by means of the clutch disks, and the motor vehicle fitted with said drive train is driven by way of the driven wheels when a gear is engaged in one component drive train.

The friction clutches are closed and opened by acting axially on the contact plates 5, 6 by means of the respective lever springs 7, 8 associated with each contact plate 5, 6. Said springs are supported on the housing component 9, which is firmly connected to the counterpressure plate 4, and, radially on the inside, at lever tips 10, 11, are moved by respective actuating systems (not shown) supported axially on the housing or the transmission, for example, along an actuating path in the direction of arrows 12, 13 and hence in the direction of the internal combustion engine, counter to the action of restoring forces, so that, when there is a reduction in the actuating force, the lever tips return to the force-free state by virtue of the restoring force.

Here, friction clutch 2 is designed as a press-shut friction clutch which, in the state shown here, in which it is not acted upon by the actuating system, is open. In this case, lever spring 7 acts on the tie rod 16 radially to the outside of the annular supporting surface 14 by means of the load imposition surface 15 situated opposite the supporting surface 14. The tie rod 16 passes through the counterpressure plate 4 in corresponding passage areas and is firmly connected to contact plate 5. When lever tips 10 are moved in the direction of arrow 12, the tie rod 16 acted upon pulls contact plate 5 in the direction of the counterpressure plate 4, and friction clutch 2 is closed. The closing process takes place counter to the action of leaf springs (not shown) between contact plate 5 and the counterpressure plate 4 and that of the lining spring system of the friction linings, with the result that, as the engagement force on lever tips 10 slackens off, contact plate 5 is moved back into the open position of friction clutch 2.

Friction clutch 3 is a press-open friction clutch, the contact plate 6 of which is clamped against the counterpressure plate 4 at the load imposition surface 18 by lever spring 8, which, for this purpose, is supported axially on the supporting surface 17 of the housing component 9, resulting in a frictional engagement for transmission of the nominal torque via the friction linings in the state in which no load is imposed by the actuating system at lever tips 11. The axial clamping of contact plate 6 takes place counter to the action of the lining spring system of the friction linings clamped between the counterpressure plate 4 and contact plate 6 and that of the leaf springs (not shown) arranged between the counterpressure plate 4 and contact plate 6 to ensure the accommodation thereof in a manner fixed against relative rotation. Movement of lever tips 11 in the direction of arrow 13 loosens the frictional engagement since contact plate 6, supported by the lining spring system and the leaf springs, follows lever spring 8, which is deflected radially outward counter to the direction of arrow 12, and establishes the opened state (shown here) of friction clutch 3.

Figure 3:
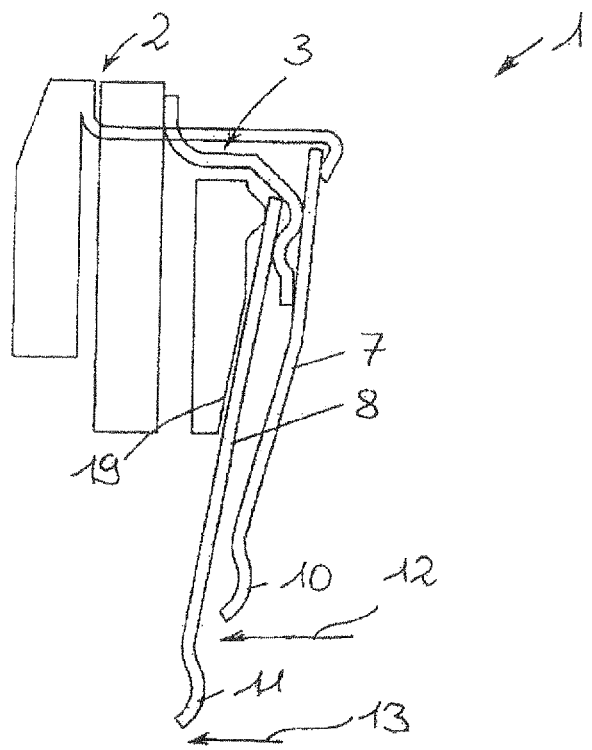
FIG. 3 shows a schematic partial section through the dual clutch in FIG. 2 after an overlapping shift.

On its inner circumference, contact plate 6 has the conical chamfer 19, enabling the path of lever tips 11 to be widened in the direction of arrow 12 and hence allowing lever spring 7 to be brought closer to lever spring 8 in all actuating states (see FIG. 3).

In the illustrated state of the two friction clutches 2, 3, the lever tips 10, 11 are at the maximum distance apart.

Figure 2:
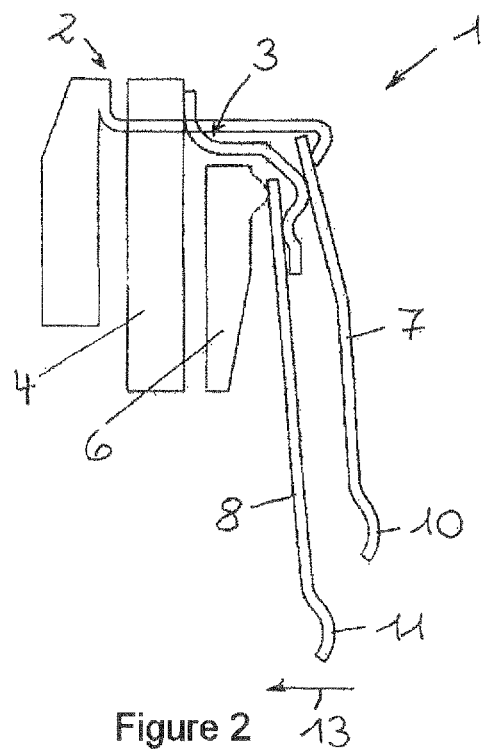
FIG. 2 shows a schematic partial section through the dual clutch in FIG. 1 with one open and one closed friction clutch.

FIG. 2 shows the dual clutch 1 in the state where friction clutch 2 is open and friction clutch 3 is closed. Here, the position of lever spring 7 is unchanged and is not subject to load by the associated actuating system. Friction clutch 3 has returned to the closed state through relief of the load on the associated actuating system. During this process, lever spring 8 has clamped contact plate 6 relative to the counterpressure plate 4. At the same time, lever tips 11 have moved counter to the direction of arrow 13 and approached lever tips 10 of lever spring 7 axially. Since friction clutch 3 is closed when the associated actuating system is not subject to a load, torque can be transmitted to the associated component drive train in an economical manner that involves little wear on the actuating system. Pairs of gearwheels for gears with particularly long running times, e.g. a gear with a high transmission ratio, are therefore preferably arranged in this component drive train.

FIG. 3 shows the operating state of the dual clutch 1 relative to the operating state in FIG. 2 after an overlapping shift. In this case, friction clutch 3 is open, as shown in FIG. 1, and friction clutch 2 is closed. This state is achieved by the lever tips 10, 11 of both lever springs 7, 8 being moved axially by the associated actuating systems in the direction of arrows 12 and 13, respectively. During this process, the lever tips 10, 11 approach one another to the maximum extent. The chamfer 19 enables lever spring 8 to be provided with a greater pivoting angle in the direction of arrow 13, thus allowing lever spring 7 to be moved closer to the latter, thereby making a further saving in terms of axial installation space.

In the state shown, torque is transmitted to the associated component drive train via friction clutch 2 when both actuating systems are operated. In virtue of the high energy consumption for operating both actuating systems, gears with a short operating time, such as the reverse gear and/or the drive-away gear, are preferably arranged in the component drive train associated with friction clutch 2.

Figure 4:
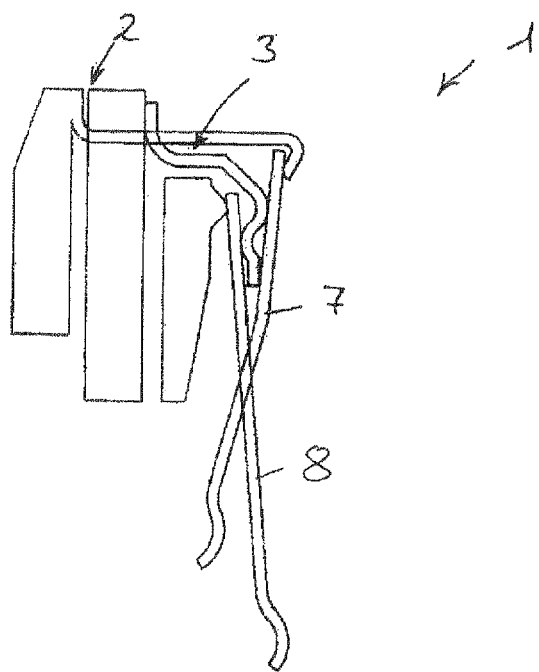
FIG. 4 shows a schematic partial section through the dual clutch in FIGS. 1 to 3 in a purely hypothetical state with both friction clutches in the closed state.

Purely hypothetically and for the sake of completeness, FIG. 4 shows the dual clutch 1 in the operating state which cannot be set, in which both friction clutches 2, 3 are closed and the lever springs 7, 8 would therefore cross and interfere with one another. This operating state plays no further part in practice since the dual clutch transmission could be locked up in this operating state. A control unit for controlling the actuating systems is therefore designed in such a way that such a state cannot be set by means of the actuating systems.

LIST OF REFERENCE SIGNS

1 Dual Clutch
2 Friction Clutch
3 Friction Clutch
4 Counterpressure Plate
5 Contact Plate
6 Contact Plate
7 Lever Spring
8 Lever Spring
9 Housing Component
10 Lever Tip
11 Lever Tip
12 Arrow
13 Arrow
14 Supporting Surface
15 Load Imposition Surface
16 Tie Rod
17 Supporting Surface
18 Load Imposition Surface
19 Chamfer

The invention claimed is:

1. A dual clutch in a drive train of a motor vehicle, which has an internal combustion engine with a crankshaft and a dual clutch transmission with transmission input shafts, the dual clutch comprising:
    two friction clutches, a first friction clutch and a second friction clutch, which transmit a torque from the internal combustion engine to the transmission input shafts of the dual clutch transmission;
    a common counterpressure plate firmly connected to the crankshaft of the internal combustion engine;
    a housing component firmly connected to the counterpressure plate;
    two lever springs, which respectively actuate the two friction clutches, supported on the housing component; and
    two contact plates, which are fixed in terms of rotation relative to the counterpressure plate and can be moved axially by means of the lever springs,
    wherein the lever springs are actuated axially in a same direction by actuating systems in a case of a change from one friction clutch to the other for torque to be transmitted via the friction clutches.

2. The dual clutch according to claim 1, wherein one of the clutches is a press-shut friction clutch and another of the clutches is a press-open friction clutch.

3. The dual clutch according to claim 2, wherein the first friction clutch faces the internal combustion engine and is actuated by means of a tie rod which passes through or overlaps the counterpressure plate and is acted upon by one of the lever springs.

4. The dual clutch according to claim 2, wherein, the second friction clutch faces the dual clutch transmission.

5. The dual clutch according to claim 1, wherein the contact plate of one of the friction clutches has a chamfer radially on an inside in an actuating direction of one of the lever springs.

6. The dual clutch according to claim 1, further comprising a control unit having a control procedure for controlling the actuating system such that an interference between the lever springs is excluded by the control procedure of the control unit.

7. The dual clutch according to claim 6, wherein one of the clutches is a press-open friction clutch and another of the clutches is a press-shut friction clutch, and the press-open friction clutch is opened when the press-shut friction clutch is closed.

8. A method for controlling two actuating systems for actuating a dual clutch in a drive train of a motor vehicle, which has an internal combustion engine with a crankshaft and a dual clutch transmission with transmission input shafts where the dual clutch comprises two friction clutches, wherein the method comprises the steps of;
    providing a first friction clutch and a second friction clutch, which transmit a torque from the internal combustion engine to the transmission input shafts of the dual clutch transmission; a common counterpressure plate firmly connected to the crankshaft of the internal combustion engine; a housing component firmly connected to the counterpressure plate; two lever springs, which respectively actuate the two friction clutches, supported on the housing component; and two contact plates, which are fixed in terms of rotation relative to the counterpressure plate and can be moved axially by means of the lever springs, wherein the lever springs are actuated axially in a same direction by actuating systems in a case of a change from one friction clutch to the other for torque to be transmitted via the friction clutches;

prioritizing a first actuating path of a first actuating system and excluding an interference with the first actuating path by a second actuating path of the second actuating system.

9. The method according to claim 8, wherein, one of the friction clutches is a press-shut friction clutch that faces the internal combustion engine along the first actuating path defined as having priority, and another of the friction clutches is a press-open friction clutch, and during a closing operation the actuating path of the press-open friction clutch is controlled so as to be greater in length than or equal to the first actuating path having priority.

* * * * *